United States Patent
Frazier et al.

(10) Patent No.: US 11,010,276 B2
(45) Date of Patent: *May 18, 2021

(54) CONFIGURABLE CODE FINGERPRINT

(71) Applicant: International Business Machines Corporation, Armonk, NY (US)

(72) Inventors: Giles R. Frazier, Austin, TX (US); Michael K. Gschwind, Chappaqua, NY (US); Christian Jacobi, West Park, NY (US); Chung-Lung K. Shum, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/591,256

(22) Filed: Oct. 2, 2019

(65) Prior Publication Data

US 2020/0034275 A1 Jan. 30, 2020

Related U.S. Application Data

(63) Continuation of application No. 16/135,795, filed on Sep. 19, 2018, now Pat. No. 10,558,552, which is a
(Continued)

(51) Int. Cl.
*G06F 11/36* (2006.01)
*G06F 11/07* (2006.01)
(Continued)

(52) U.S. Cl.
CPC .......... *G06F 11/3636* (2013.01); *G06F 8/41* (2013.01); *G06F 9/44589* (2013.01);
(Continued)

(58) Field of Classification Search
None
See application file for complete search history.

(56) References Cited

U.S. PATENT DOCUMENTS 7,882,221 B2 2/2011 Sailer
9,003,529 B2 4/2015 Lospinuso
(Continued)

FOREIGN PATENT DOCUMENTS

| CN | 103488430 | 1/2014 |
| EP | 1752913 | 2/2007 |
| WO | WO 02/48485 | 6/2002 |

OTHER PUBLICATIONS

Mell et al., "The NIST Definition of Cloud Computing" National Institute of Standards and Technology, U.S. Department of Commerce, NIST Special Publication 800-145, Sep. 2011, 7 pages.
(Continued)

*Primary Examiner* — Qing Chen
(74) *Attorney, Agent, or Firm* — Heslin Rothenberg Farley & Mesiti P.C.; Steven Chiu, Esq.

(57) ABSTRACT

A method, computer program product, and system performing a method that include a processor defining a code fingerprint by obtaining parameters describing at least one of an event type or an event. The code fingerprint includes a first sequence. The processor loads the code fingerprint into a register accessible to the processor. Concurrent with executing a program, the processor obtains the code fingerprint from the register and identifies the code fingerprint in the program by comparing a second sequence in the program to the first sequence. Based on identifying the code fingerprint in the program, the processor alerts a runtime environment where the program is executing.

20 Claims, 10 Drawing Sheets

Related U.S. Application Data continuation of application No. 15/289,513, filed on Oct. 10, 2016, now Pat. No. 10,157,119, which is a continuation of application No. 14/987,220, filed on Jan. 4, 2016, now Pat. No. 9,552,278.

(51) Int. Cl.
*G06F 8/41* (2018.01)
*G06F 9/445* (2018.01)

(52) U.S. Cl.
CPC ...... *G06F 11/0706* (2013.01); *G06F 11/0751* (2013.01); *G06F 11/3688* (2013.01)

(56) References Cited

U.S. PATENT DOCUMENTS

| | | | |
|---|---|---|---|
| 9,111,095 B2 | 8/2015 | Cohen | |
| 9,471,314 B1* | 10/2016 | Bonanno | G06F 9/3848 |
| 9,552,278 B1 | 1/2017 | Frazier et al. | |
| 10,157,119 B2 | 12/2018 | Frazier et al. | |
| 2004/0015922 A1 | 1/2004 | Kitakami et al. | |
| 2006/0048106 A1 | 3/2006 | Citron et al. | |
| 2007/0140530 A1 | 6/2007 | Coogan et al. | |
| 2007/0162895 A1 | 7/2007 | Altman et al. | |
| 2008/0215920 A1 | 9/2008 | Mayer et al. | |
| 2008/0235372 A1 | 9/2008 | Sailer et al. | |
| 2008/0267464 A1 | 10/2008 | Goda | |
| 2009/0030994 A1 | 1/2009 | Usher | |
| 2009/0248848 A1 | 10/2009 | Jeong et al. | |
| 2009/0293125 A1 | 11/2009 | Szor | |
| 2010/0026451 A1 | 2/2010 | Erhart et al. | |
| 2011/0006880 A1 | 1/2011 | Long et al. | |
| 2011/0113407 A1 | 5/2011 | Mariani et al. | |
| 2012/0084148 A1 | 4/2012 | Won | |
| 2013/0212073 A1 | 8/2013 | Cochran et al. | |
| 2013/0091571 A1 | 11/2013 | Lu | |
| 2014/0068768 A1 | 3/2014 | Lospinuso et al. | |
| 2014/0181488 A1 | 6/2014 | Sama et al. | |
| 2014/0223565 A1 | 8/2014 | Cohen | |
| 2015/0089204 A1* | 3/2015 | Henry | G06F 9/3001 712/221 |
| 2015/0186636 A1 | 7/2015 | Tharappel et al. | |
| 2015/0186649 A1 | 7/2015 | Humble et al. | |
| 2015/0365437 A1 | 12/2015 | Bell, Jr. et al. | |
| 2017/0010973 A1* | 1/2017 | Mizrahi | G06F 12/0862 |
| 2017/0192800 A1 | 7/2017 | Frazier et al. | |
| 2019/0018757 A1 | 1/2019 | Frazier et al. | |

OTHER PUBLICATIONS

Nema et al. "Generate A Secodn Multi-Purpose Code From Fingerprint Images", Al-Mansour Journal Issue (16), 2011, 12 pages.

Tardos, Gabor, "Optimal Probalistic Fingerprint Codes," Jun. 2003, ACM, p. 116-125.

Keivanloo et al., "Java Bytecode Clone Detection via Relaxation on Code Fingerprint and Semantic Web Reasoning," 2012, IEEE, p. 36-42.

List of IBM Patent Applications Treated as Related, Nov. 13, 2019, 2 pages.

* cited by examiner

200

210

Program code selects parameters related to an event type and an event to define a code fingerprint.

220

Program code loads the code fingerprint into a register accessible to the processor.

230

During execution of a program, program code reads the register to identify the fingerprint in the register.

240

Program code alerts the runtime environment that the fingerprint has been recognized.

Program code selects parameters including at least one event to define a code fingerprint

520

Program code loads the code fingerprint into a register accessible to the processor.

530

During execution of a program, program code identifies when the sequence comprising the fingerprint occurs .

540

Program code alerts the runtime environment that the sequence has occurred.

FIG. 5

CONFIGURABLE CODE FINGERPRINT

BACKGROUND

A code fingerprint, referred to herein also as a fingerprint, is specific processor behavior that occurs when a given section of code is executing. This processor behavior includes any recognizable behavior such as a particular sequence of branch prediction hits and misses, a particular sequence of data cache hits and misses, a particular sequence of taken and not taken branch instructions, and/or any other behavior or pattern recognizable by hardware. Code fingerprints include, but are not limited to: data cache hit miss sequences for various cache levels, data cache hit miss sequences for a given instruction at a given cache level, sequences of correct/incorrect predictions for either a code segment or for a specific set of branches in a code segment, and a branch taken/not taken history when a given instruction is executed.

The number of code fingerprints that a given processor can recognize when code is executed in a computing environment is presently limited because different types of hardware are required to recognize different types of behaviors that comprise different code fingerprints. Thus, a given processor may only recognize a limited number of code fingerprints, which can lead to issues. For example, if recognition of a given fingerprint is not supported in a computing environment, the runtime environment has no way of confirming that a certain sequence is occurring.

SUMMARY

Shortcomings of the prior art are overcome and additional advantages are provided through the provision of a computer program product for configuring a processor to recognize a code fingerprint. The computer program product comprises a storage medium readable by a processing circuit and storing instructions for execution by the processing circuit for performing a method. The method includes, for instance: defining, by a processor, a code fingerprint, by obtaining parameters describing at least one of an event type or an event, and wherein the code fingerprint comprises a first sequence; loading, by the processor, the code fingerprint into a register accessible to the processor; concurrent with executing a program, obtaining, by the processor, the code fingerprint from the register; identifying, by the processor, the code fingerprint in the program, by comparing a second sequence in the program to the first sequence; and based on the identifying, alerting, by the processor, a runtime environment, wherein the program is executing in the runtime environment.

Shortcomings of the prior art are overcome and additional advantages are provided through the provision of a method of configuring a processor to recognize a code fingerprint. The method includes, for instance: defining, by a processor, a code fingerprint, by obtaining parameters describing at least one of an event type or an event, and wherein the code fingerprint comprises a first sequence; loading, by the processor, the code fingerprint into a register accessible to the processor; concurrent with executing a program, obtaining, by the processor, the code fingerprint from the register; identifying, by the processor, the code fingerprint in the program, by comparing a second sequence in the program to the first sequence; and based on the identifying, alerting, by the processor, a runtime environment, wherein the program is executing in the runtime environment.

Shortcomings of the prior art are overcome and additional advantages are provided through the provision of a system for configuring a processor to recognize a code fingerprint. The system includes a memory, one or more processor in communication with the memory, and program instructions executable by the one or more processor via the memory to perform a method. The method includes, for instance: defining, by a processor, a code fingerprint, by obtaining parameters describing at least one of an event type or an event, and wherein the code fingerprint comprises a first sequence; loading, by the processor, the code fingerprint into a register accessible to the processor; concurrent with executing a program, obtaining, by the processor, the code fingerprint from the register; identifying, by the processor, the code fingerprint in the program, by comparing a second sequence in the program to the first sequence; and based on the identifying, alerting, by the processor, a runtime environment, wherein the program is executing in the runtime environment.

Methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects. For example, aspects of embodiments of the present invention may also include: obtaining, by the processor, additional data and compressing the data utilizing the architected dictionary. The compressing may include walking, by the processor, from dictionary entries to ranks without performing a memory lookup.

In and embodiment of the present invention, the parameters describe one of: a load-type event or a branch-type event. In an embodiment of the present invention the obtaining parameters further comprises obtaining a plurality of parameters from a source, retaining the plurality of parameters in a register, and selecting the parameters from the plurality of parameters in the register.

In an embodiment of the present invention the first sequence comprises a measured sequence and in an embodiment of the present invention, the code fingerprint comprises a conditional branch sequence with a target address in an instruction.

In an embodiment of the present invention, the comparing of the second sequence to the first sequence may include obtaining, by the processor, the second sequence from a second register; and comparing, by the processor, the first sequence and the second sequence and determining that the first sequence and the second sequence are identical.

In an embodiment of the present invention, the comparing of the second sequence to the first sequence may include obtaining, by the processor, the second sequence from a second register; and comparing, by the processor, the first sequence and the second sequence and determining that a hamming distance between the first sequence and the second sequence comprises less than a specified value.

In an embodiment of the present invention, the alerting comprises triggering, by the processor, a trap. In an embodiment of the present invention, the alerting comprises triggering, by the processor, a trap when a specific processor behavior described by the code fingerprint occurs at a given address.

In an embodiment of the present invention, the identifying further comprises obtaining, by the processor, the second sequence from the program, by identifying when the second sequence occurs in the program, wherein the second sequence comprises the first sequence.

Aspects of certain embodiment of the present invention may also include: defining, by the processor, a new code fingerprint, wherein the new code fingerprint comprises a third sequence; loading, by the processor, the new code fingerprint into the register accessible to the processor; and concurrent with the loading the new code fingerprint into the register, loading the code fingerprint into an historical register.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIG. 2 depicts a workflow associated with aspects of an embodiment of the present invention;

FIG. 5 depicts a workflow associated with aspects of an embodiment of the present invention;

DETAILED DESCRIPTION

Figure 1:
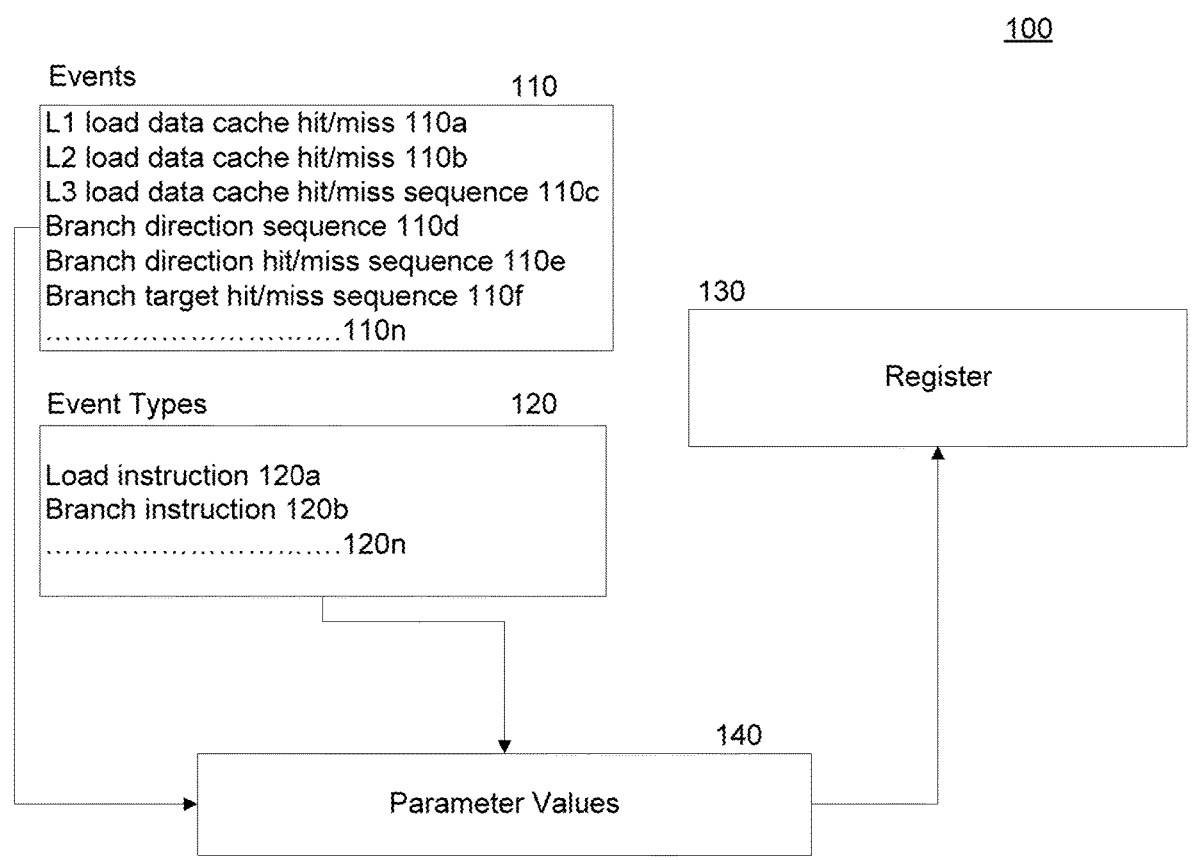
FIG. 1 depicts aspects of an embodiment of the present invention.

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention. As understood by one of skill in the art, the accompanying figures are provided for ease of understanding and illustrate aspects of certain embodiments of the present invention. The invention is not limited to the embodiments depicted in the figures.

As understood by one of skill in the art, program code, as referred to throughout this application, includes both software and hardware. For example, program code in certain embodiments of the present invention includes fixed function hardware, while other embodiments utilized a software-based implementation of the functionality described. Certain embodiments combine both types of program code.

Aspects of certain embodiments of the present invention include program code 40 (see, FIG. 8) executed by at least one processor 16 (FIG. 8) that enables a runtime environment to configure the at least one processor to recognize a fingerprint. This configurable fingerprint recognition aspect of certain embodiments of the present invention provides an advantage in computing technology because it eliminates the cost of multiple special-purpose fingerprint recognition functions by extending the functionality of a given set of fingerprint logic. This aspect of the present invention represents an improvement to existing computing technology as presently, in order to recognize a range of different types of fingerprints, a range of different hardware is required in a computing environment.

An advantage of certain embodiments of the present invention is these embodiments include an aspect that is configurable by a runtime environment to recognize a range of fingerprints. Utilizing this functionality, program code executed by a processor in certain embodiments of the present invention recognizes a range of different program behaviors. Again, this configurable aspect represents an improvement to existing computing technology as presently, in order to recognize a range of different types of fingerprints, a range of different hardware is required in a computing environment.

Aspects of some embodiments of the present invention may be utilized to verify that certain code segments have been optimized. In a computer system that does not include aspects of the present invention, a Just in Time (JIT) compiler has optimized a code segment with the expectation of causing this segment causing a certain sequence of taken/not taken branch instructions, or a certain sequence of load hits and misses. However, the processor in this computer system may only provide support for fingerprints of some other type (e.g., branch target hits/misses, etc.) due to the cost of supporting each type of fingerprint function. Thus, despite the expected fingerprint associated with this code segment, the runtime environment of this computer system will not be able to confirm that this optimization, expected to cause a certain branch taken/not taken sequence, is occurring. By integrating aspects of certain embodiments of the present invention into this computer system, the utility that recognizes fingerprints is configurable by the runtime environment, so the processor is not limited by this earlier constraint and can be configured, utilizing aspects of the present invention, to recognize that this optimization is occurring.

Aspects of some embodiments of the present invention may be utilized to enable a runtime environment to identify certain types of behaviors in real-time. Embodiments of the present invention can be configured by the runtime environment to recognize a wide range of fingerprints, thereby enabling a wide range of program behaviors to be recognizable. In a computer system where this aspect of the present invention is not available, when a runtime environment, for example, attempts to ensure that data cache misses are never or rarely occurring over a certain segment of code, it may be unable to do so because the processor may only recognize branch type fingerprints. Alternatively, this runtime environment may need an L2 data cache hit fingerprint to ensure a particular behavior is occurring, but the processor may only provide L1 data cache fingerprints. In these examples, due to the limitations of what the processor can recognize, the compiler must use some other means of identifying the desired behavior, or, depending on the constraints of the computer system and its ability to include duplicative hardware, may not be able to monitor the desired behavior at all. Thus, by integrating aspects of the present invention into the computer system, an embodiment of the present invention can provide the computer system with a single fingerprint function that is configurable by the runtime environment and therefore, able to recognize the wide range of fingerprints, enabling program code executed by the processor to recognize a wide range of program behaviors.

An advantage of certain embodiments of the present invention is that they enable a computer system to include a single type of "generic" hardware. Only one type of hardware is needed as it can be configured to record and recognize a wide range of fingerprint types and histories. Thus, in certain embodiments of the present invention, the runtime environment can configure this hardware to record and recognize a much wider range of fingerprints than is currently possible in present computer systems, where the type of fingerprints that can be recognized by a given hardware unit is static. By providing configurable fingerprint recognition, certain embodiments of the present invention utilize a single set of hardware instead of multiple hardwired fingerprint registers, to recognize a given range of fingerprints. The integration of this functionality into a single hardware provides more accurate measurements of program behavior and provides the opportunity for improved optimization of the program code.

FIG. 1 illustrates certain aspects of an embodiment of the present invention. An embodiment of the present invention includes a configuration register 100 in which a runtime environment may configure to recognize one or more fingerprints representing different code segments and/or behaviors, including but not limited to, sequential behaviors of branch or load instruction types. In an embodiment of the present invention, the configuration register 100 may be integrated into the hardware of a processor, for example, in an embodiment of the present invention, the configuration register 100 is included in a field-programmable gate array (FPGA) in a processing unit 16.

In an embodiment of the present invention, the configuration register 100 includes parameter values 140 that include events 110a-110n and types of events 120a-120n. These parameter values 140 specify the type of behavior (fingerprint) that program code 40 in the runtime environment may recognize.

In an embodiment of the present invention, the events 110a-110n can be contained in the configuration register 100 in a first group 110 and the event types 120a-120n, can be included in the configuration register in a second group 120. These group designations represent certain non-limiting embodiments of the present invention. The events 110a-110n and types of events 120a-120b are parameter values 140 that may be utilized by the program code 40 to specify the behavior to be recognized by a processor.

As illustrated by FIG. 1, in an embodiment of the present invention, these events may include, but are not limited to, Level 1 (L1) load data cache hit/miss sequence 110a, Level 2 (L2) load data cache hit/miss sequence 110b, Level 3 (L3) load data cache hit/miss sequence 110c, Branch direction sequence 110d, Branch direction hit/miss sequence 110e, and Branch target hit/miss sequence 110f. Parameters values 140 in an embodiment of the present invention may also include additional events 110g-110n.

Referring to FIG. 1, in an embodiment of the present invention, the configuration register 100 also includes events 120a-120b. In this example, the events include a load-type event, Load instruction 120a, and a branch-type event, Branch instruction 120b. Embodiments of the present invention may include additional event types 120c-120n.

In an embodiment of the present invention, the configuration register 100 also includes a Measured Sequence output register 130. As will be described in FIG. 2, program code 40 (see, FIG. 4) utilizes the various portions of the control register 100 to configure a processor accessing the register to recognize fingerprints based on behaviors the program code 40 defined in the control register 100.

Figure 8:
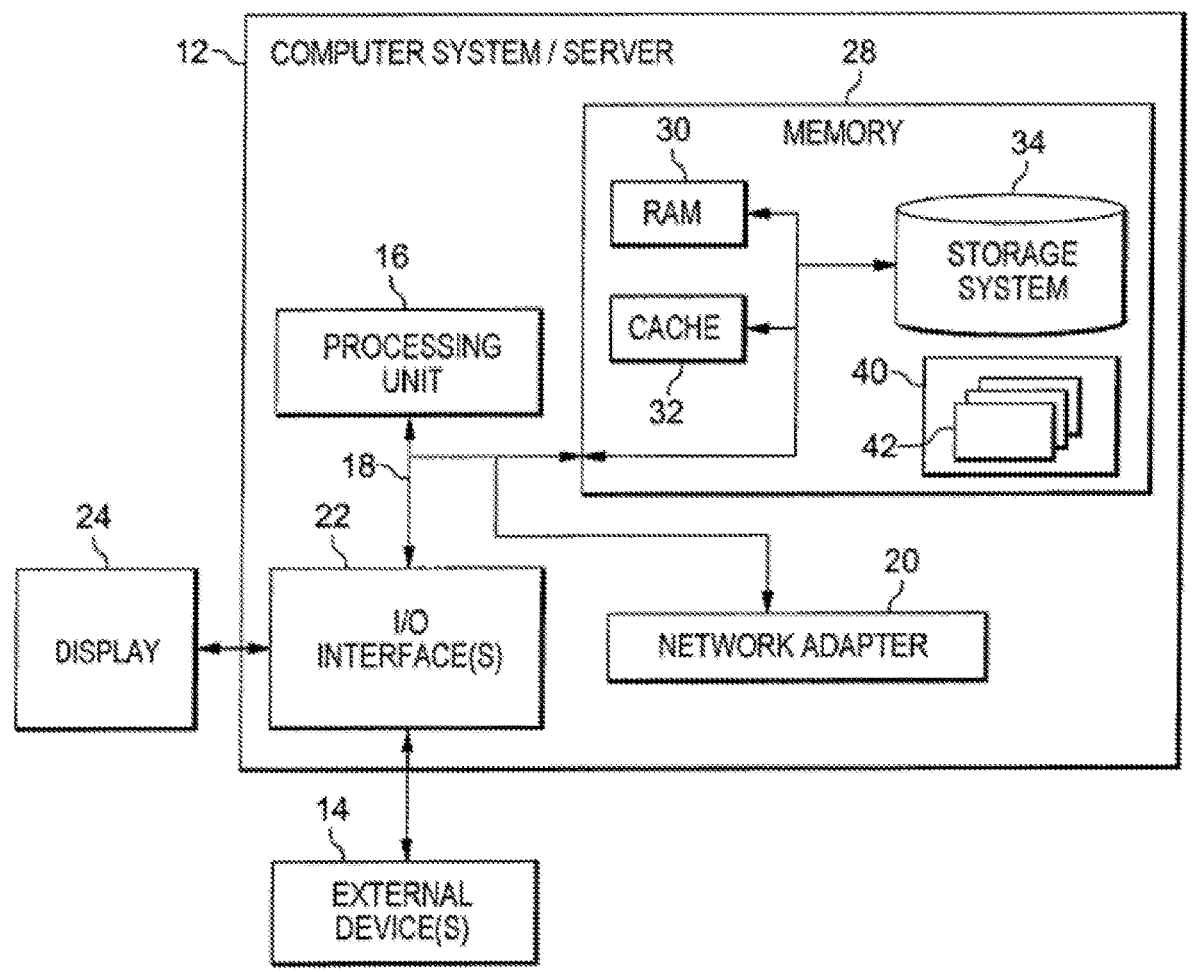
FIG. 8 depicts one embodiment of a cloud computing node.

For ease of understanding, the workflow 200 of FIG. 2 illustrates certain aspects of an embodiment of the present invention by making reference to portions of control register 100 of FIG. 1 and to portions of the computer system in in FIG. 8. As understood by one of skill in the art, references to this particular embodiment are offered not as a limitation to the aspects described in FIG. 2, but merely to illustrate a non-limiting example and are included for ease of understanding.

Referring to FIG. 2, in an embodiment of the present invention, program code 40 selects parameters related to an event type and an event to define a code fingerprint (210). As seen in FIG. 1, types of events may include, but are not limited to, load-type events and/or branch-type events. Based on selecting a type of event, the program code 40 selects one or more events. For example, when the program code 40 selects a load-type event, the program code may also 40 select as parameters one or more event of this type, e.g., L1 load data cache hit/miss sequence 110a, L2 load data cache hit/miss sequence 110b, and/or L3 load data cache hit/miss sequence 110c. Similarly, when the program code 40 selects a branch-type event as a parameter, the program code 40 can select a branch event (e.g., Branch direction sequence 110d, Branch direction hit/miss sequence 110e, and Branch target hit/miss sequence 110f).

In an embodiment of the present invention, before selecting the parameters, the program code 40 may obtain the parameters from a source, including a software and/or hardware memory 28 (FIG. 8). The program code 40 may select certain parameters from the parameters it obtained.

Returning to FIG. 2, in an embodiment of the present invention, as program code 40 loads the one or more selected parameters, which comprise the code fingerprint, into a register (220). As understood by one of skill in the art, one or more of the aspects described in FIG. 2 are carried out by a processor, which executes program code 40. For example, as program code 40 executes, the processor may load the one or more selected parameters, which comprise the code fingerprint, into the register. In an embodiment of the present invention, this register may be a Measured Sequence output register 130. Thus, returning to the examples discussed, when the program code 40 selects a load-type event is selected, the program code loads the selected type of load event (e.g., L1 load data cache hit/miss sequence 110a, L2 load data cache hit/miss sequence 110b, and/or L3 load data cache hit/miss sequence 110c) into the Measured Sequence output register 130. Similarly, when the program code 40 selected a branch-type event, the program code loads the selected type of branch event (Branch direction sequence 110d, Branch direction hit/miss sequence 110e, and Branch target hit/miss sequence 110f) into the Measured Sequence output register 130.

In an embodiment of the present invention, if a parameter field in the configuration register 100 specifies branch target hit/miss sequence, all unconditional and direct (i.e., sequences with a target address in the instruction) branch instructions will be hits. Some embodiments may ignore such branch instructions, and include only conditional branch instructions in the fingerprint.

In an embodiment of the present invention, during execution of a program, system, program code 40, which may be understood as the processor based on a hardware embodiment (e.g., configured fingerprint hardware) reads the register (e.g., the measured sequence register) to identify the code fingerprint (i.e., behavior) in the register (230). Some embodiment of the present invention may utilize hardware (i.e., the program code term will refer to hardware, an action by the processor) as in some cases, software may not have visibility to cache hit/miss ratios unless the hardware (e.g., a configured fingerprint recognizer) recognizes the sequences, does the comparison, and causes the lightweight interrupt.

In an embodiment of the present invention, this identifying includes the program code 40 comparing the sequence in the register (e.g., the sequence that the program code loaded into the Measured Sequence register 130) to a sequence in a second register (e.g., a desired sequence register). In an embodiment of the present invention, hardware, for example hardware included in a processor of the computing system, compares these sequences. When comparing the sequences, the program code 40 may identify identical sequences in the registers and/or the program code 40 may identify a fuzzy match, which would occur, for example, when a hamming distance between the expected and measured sequences is less than a specified value.

Based on identifying the fingerprint in the register, the program code 40 alerts the runtime environment that the fingerprint (i.e., behavior) has been recognized (240). In an embodiment of the present invention, the program code 40 alerts the runtime environment by triggering a trap, including but not limited to, a lightweight trap, such as an EBB. In an embodiment of the present invention, the program code 40 identifies a behavior defined by the program in the register when the behavior occurs at a given address.

In some embodiments of the present invention, based on the behaviors defined in the configuration register 100, the program code 40 may not load selected parameters into a register, including but not limited to, the Measured Sequence output register 130. For example, if the program code 40 selects a parameter that specifies a branch target hit/miss sequence, all unconditional branch instructions and all branch instructions that have the target in the instruction will be hits. Thus, if there is no need for the program code 40 to load the unconditional branch outcomes into the Measured Sequence output register 130, because they will be all hits, then in an embodiment of the present invention, an additional input (i.e., event type) can be added to the to the second group 120.

Figure 3:
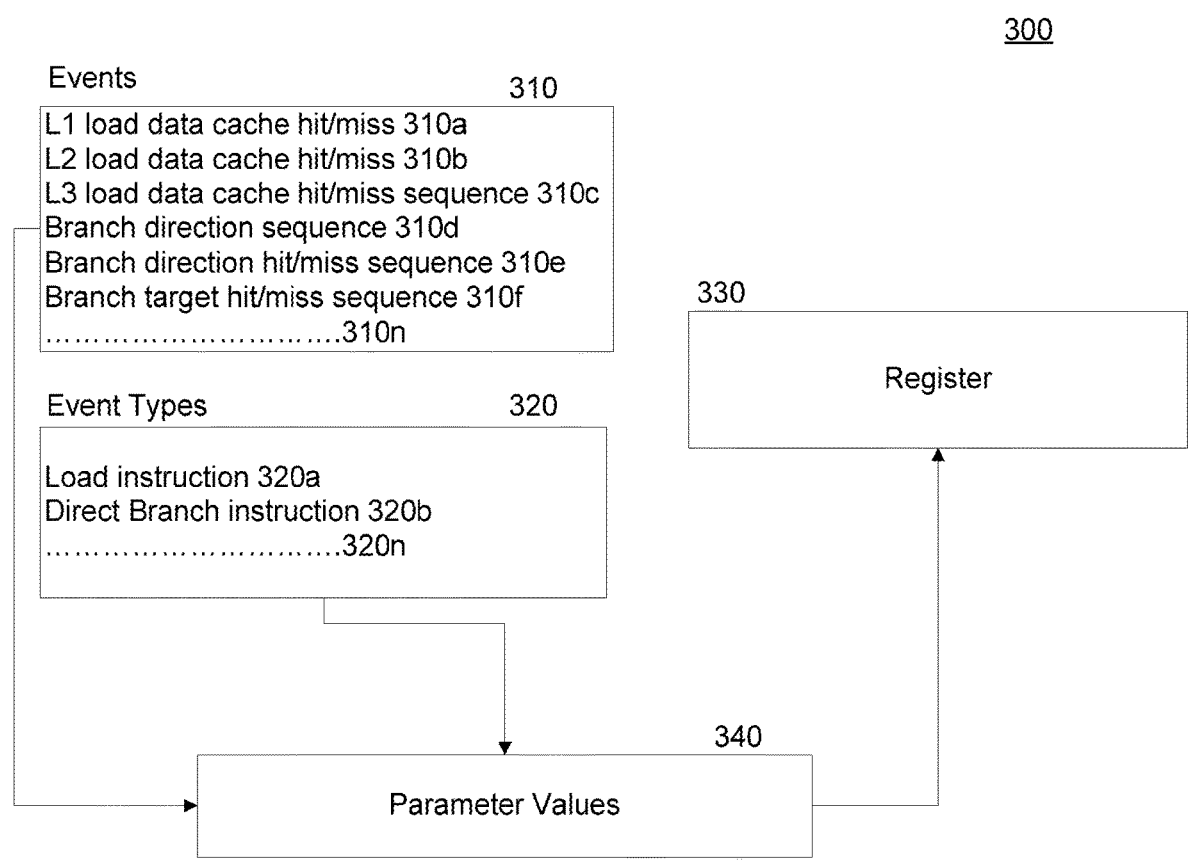
FIG. 3 depicts aspects of an embodiment of the present invention.

FIG. 3 depicts an embodiment of the present invention where the program code 40 loads direct branches, and not indirect branches, into a register. As illustrated in the embodiment, the second group 320 includes, instead of a single event type representing a branch-type event, Branch instruction 120b (FIG. 1), and a Direct Branch instruction 320b. In an embodiment of the present invention, an Indirect Branch instruction cannot be selected as an event because the program code 40 (which, as aforementioned, can be understood as a hardware embodiment) only loads direct branches. A direct branch instruction comprises a conditional branch (sequence) with a target address in the instruction. Meanwhile, an indirect branch instruction comprises a conditional branch (sequence) with a target address in a register.

Figure 4:
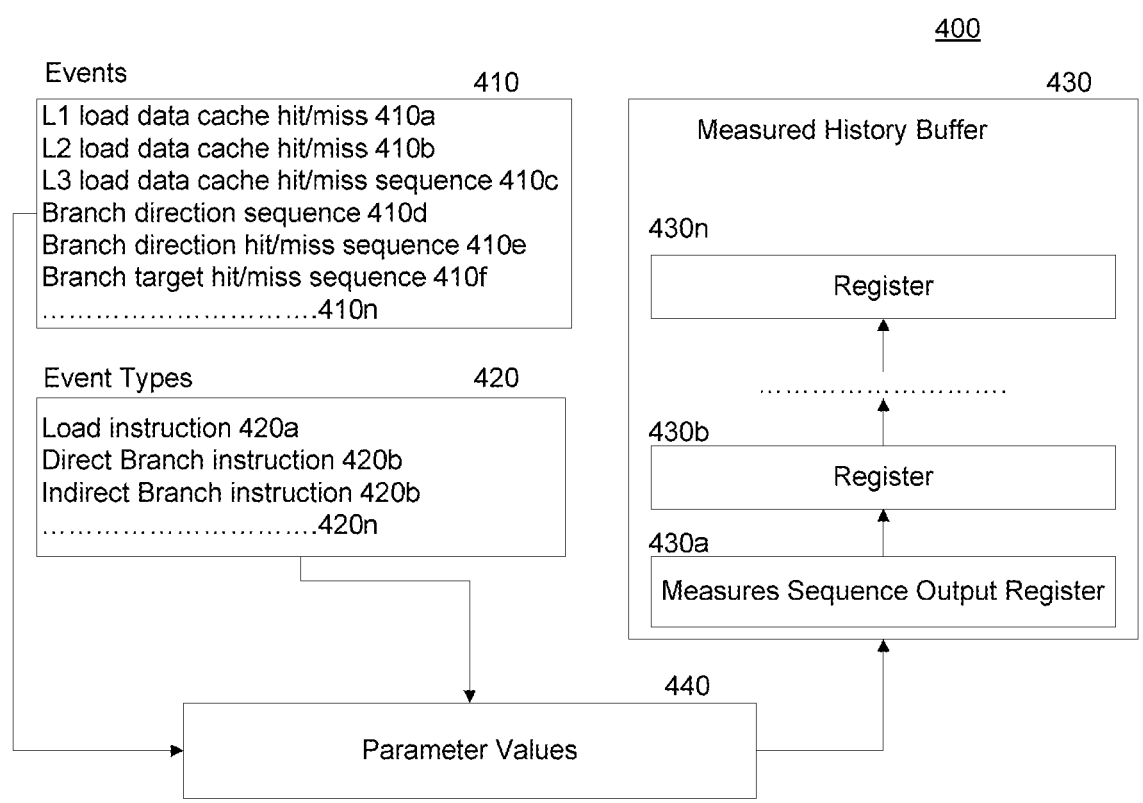
FIG. 4 depicts aspects of an embodiment of the present invention.

FIG. 4 depicts an embodiment of the present invention that provides a configuration register 400 with configurable fingerprint that includes a selected sequence of values of a multi-bit parameter. These values may include, but are not limited to: a sequence of taken branch target addresses, a sequence of taken conditional branch target addresses, a sequence of effective addresses loaded or stored, and/or a sequence of call signature register values. This embodiment of the present invention includes events 410a-410n, in a first group 410, from which the program code 40 may select to configure a code fingerprint. Although not shown in FIG. 4, in the described embodiment of the present invention that include multi-bit parameters, the Events 410 would include these multi-bit parameters, including, but not limited to: a sequence of taken branch target addresses, a sequence of taken conditional branch target addresses, a sequence of effective addresses loaded or stored, and/or a sequence of call signature register values.

An advantage of this embodiment of the present invention is that it maintains an historical record of fingerprints configured in the configuration register 400 and identified by a processor during execution of a program. In the embodiment of FIG. 4, an output register, a Measured Sequence output register 430a is part of a Measured History Buffer 430. The Measured History Buffer 430 contains a history of fingerprints configured, loaded in the output register, and identified by program code executed by the processor during program execution. When the program code 40 loads a new code fingerprint to the Measured Sequence output register 430a, program code 40 loads the content of the Measured Sequence output register 430a, to the first most current historical output register 430b, loading the content of this register to the second most current historical output register 430c. The program code 40 moves (e.g., downshifts) the content of the remaining registers in the Measured History Buffer 430 accordingly. In an embodiment of the present invention, as each such downshift occurs, the program may compare the Measured Sequence History Buffer 330 to an expected history buffer (not shown), and if a match between the Measured Sequence History Buffer 330 and the expected sequence history buffer occurs, the program code 40 may alert the program, or the program code 40 may trigger another action.

FIG. 5 depicts a workflow 500 associated with aspects of the certain embodiments of the present invention, including the embodiment illustrated by FIG. 4.

In an embodiment of the present invention, program code 40 selects parameters including at least one event (e.g., loaded address, branch target, call signature, etc.) to define a code fingerprint (510). In this embodiment of the present invention, each event includes a sequence of multi-bit values. The program code 40 loads the code fingerprint, which comprises a sequence of multi-bit values, into a register accessible to the processor (520). During execution of a program, program code 40 identifies when the sequence comprising the fingerprint occurs (530). The program code 40 alerts the runtime environment that the sequence has occurred (540). The program code 40 may alert the runtime environment by providing a lightweight trap.

As depicted in FIG. 430, in an embodiment of the present invention, the Measured History Buffer 430 comprises multiple registers, each containing a sequence. In this embodiment, the code fingerprint that the program code 40 identifies includes the most-recent "n" multi-bit fingerprints, e.g., the most-recent "n" call signatures. Thus, in this embodiment, when the program code 40 (e.g., the processor in a hardware embodiment) determined that all the n most-recent observed call signatures are the same as the sequence of call signatures that was configured by the program code 40, then the program code 40 generates a lightweight interrupt.

Figure 6:
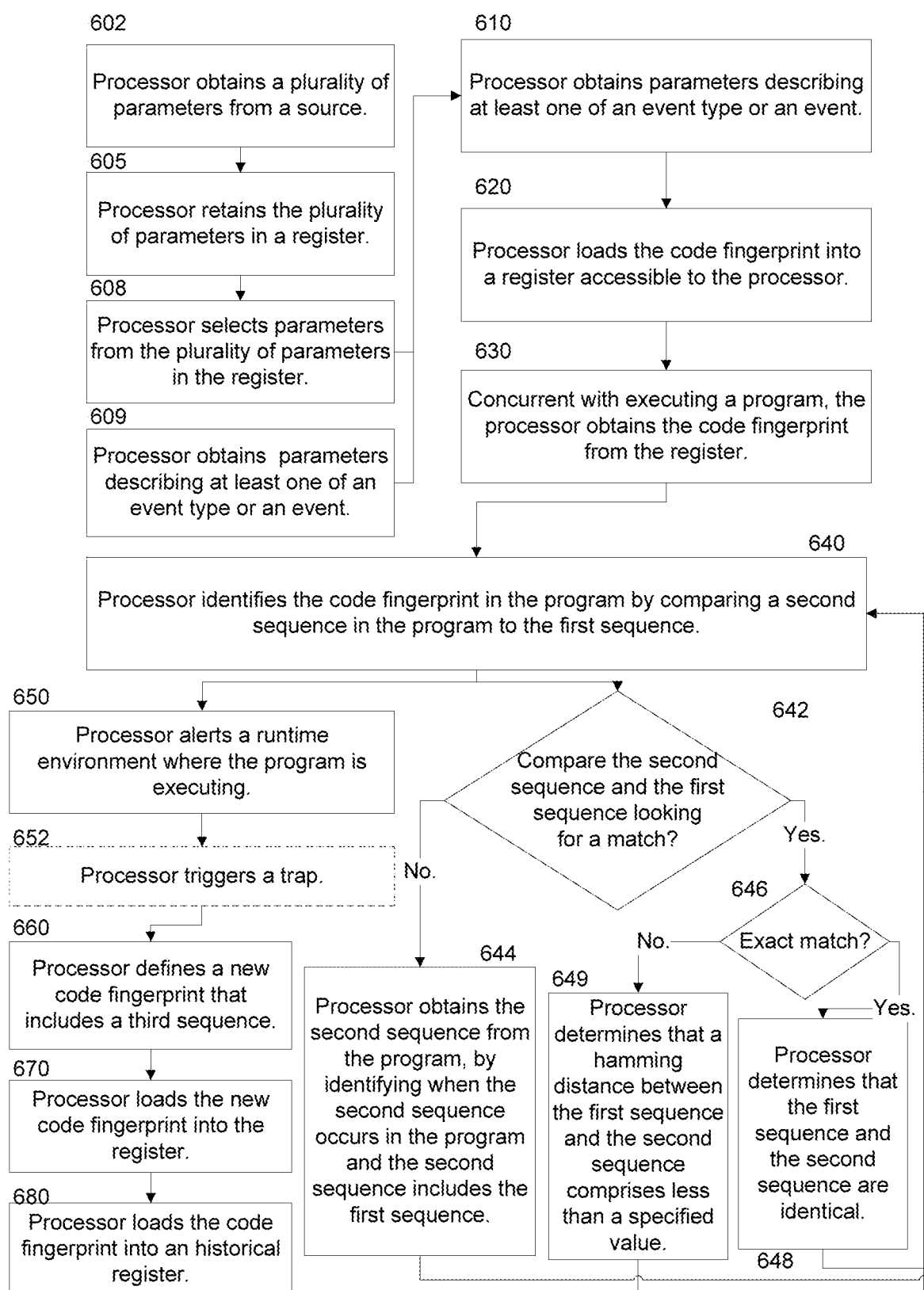
FIG. 6 depicts a workflow associated with aspects of an embodiment of the present invention.

FIG. 6 also depicts a workflow 600 associated with aspects of an embodiment of the present invention. In an embodiment of the present invention, a processor (e.g., program code executing on a processor) obtains a plurality of parameters from a source (602). The processor retains the plurality of parameters in a register (605), and selects parameters from the plurality of parameters in the register (608). The processor obtains the parameters describing at least one of an event type or an event (610). In an embodiment of the present invention, the processor obtains a load-type event or a branch-type event as part of the parameters (609).

In an embodiment of the present invention, when the processor obtains the plurality of parameters (602), retains the plurality of parameters (605), and selects parameters from the plurality of parameters (608), these aspects of this embodiment of the present invention may be part of the processor obtaining parameters describing at least one of an event type or an event (610).

In an embodiment of the present invention, the processor obtains a load-type event or a branch-type event as part of the parameters (609) may be part of the processor obtaining parameters describing at least one of an event type or an event (610).

The code fingerprint includes a first sequence, which may be a measured sequence. In an embodiment of the present invention, the code fingerprint includes a conditional branch sequence with a target address in an instruction. The processor loads the code fingerprint into a register accessible to the processor (620). Concurrent with executing a program, the processor obtains the code fingerprint from the register (630).

The processor identifies the code fingerprint in the program by comparing a second sequence in the program to the first sequence (640). Depending of the embodiment of the present invention, when the processor identifies the code fingerprint by comparing the sequences, it can do so taking different approaches, some of which are illustrated in FIG. 6. For example, the processor may compare the first sequence and the second sequence looking for a match (642). In an embodiment where the processor does not look for this match, when the processor identifies the code fingerprint, the processor obtains the second sequence from the program, by identifying when the second sequence occurs in the program and the second sequence includes the first sequence (644).

Figure 7:
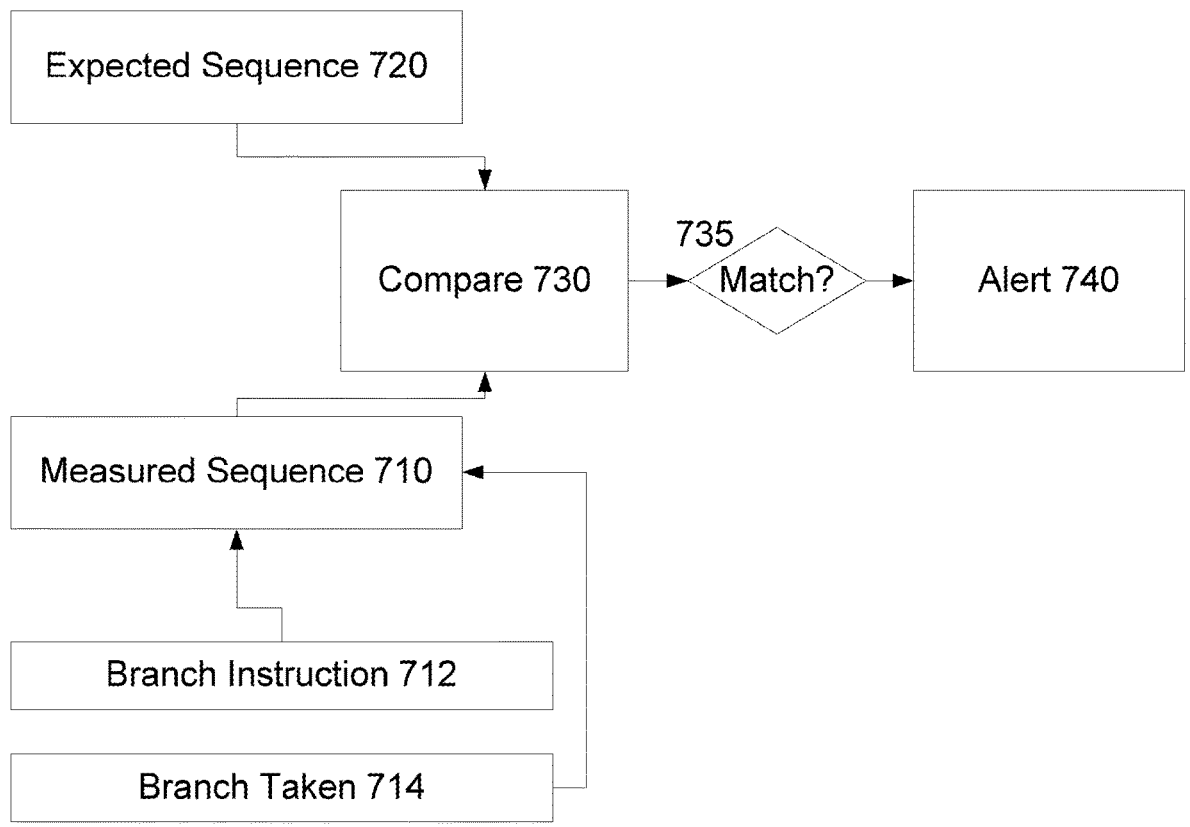
FIG. 7 depicts aspects of an embodiment of the present invention.

FIG. 7 illustrates an example of how, in one example, the processor obtains the second sequence from the program, by identifying when the second sequence occurs in the program and the second sequence includes the first sequence (FIG. 6, 644). In FIG. 2, program code 40 configured the Measured Sequence 710, as described earlier. The program code 40 provides an Expected Sequence 720, which is a sequence from the program executing in the runtime environment of the computer system. Based on receiving the Expected Sequence 720 from the program code 40, the processor compares the Expected Sequence 720 with the fingerprint that is the Measured Sequence 710. If the sequences match 735, the program code 40 (processor) generates an alert.

Depending upon the embodiment of the present invention, when the processor compares the second sequence and the first sequence, it may be looking for an exact match or an approximate, i.e., fuzzy, match (646). In an embodiment of the present invention, the processor compares the sequences by obtaining the second sequence from a second register, comparing the first sequence and the second sequence, and determines that the first sequence and the second sequence are identical (648). In an embodiment of the present invention, the processor compares the sequences by obtaining the second sequence from a second register, comparing the first sequence and the second sequence, and determines that a hamming distance between the first sequence and the second sequence comprises less than a specified value (649).

In an embodiment of the present invention, when the processor obtains the second sequence from the program, by identifying when the second sequence occurs in the program and the second sequence includes the first sequence (644), determines that the first sequence and the second sequence are identical (648), or determines that a hamming distance between the first sequence and the second sequence comprises less than a specified value (649), these aspects of this embodiment of the present invention may each individually comprise the processor identifying the code fingerprint in the program by comparing a second sequence in the program to the first sequence (640).

Based on identifying the code fingerprint, the processor alerts a runtime environment where the program is executing (650). In an embodiment of the present invention, the processor alerts the runtime environment by triggering a lightweight trap (652). In an embodiment of the present invention, the processor alerts the runtime environment by triggering a lightweight trap when a specific processor behavior described by the code fingerprint occurs at a given address.

Returning to FIG. 6, in an embodiment of the present invention, the processor defines a new code fingerprint; the new fingerprint includes a third sequence (660). The processor loads the new code fingerprint into the register accessible to the processor (670). Concurrent with loading the new code fingerprint into the register, the processor loads the code fingerprint into an historical register (680). This aspect of certain embodiment of the present the invention was illustrated earlier in FIG. 4. As illustrated in FIG. 4, after loading into the historical register(s), the processor (also referred to as the program code) compares the set of observed historical measured values to the set of configured values that the program configured into the configurable fingerprint recognition hardware.

One or more aspects may relate to cloud computing.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 8, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 9:
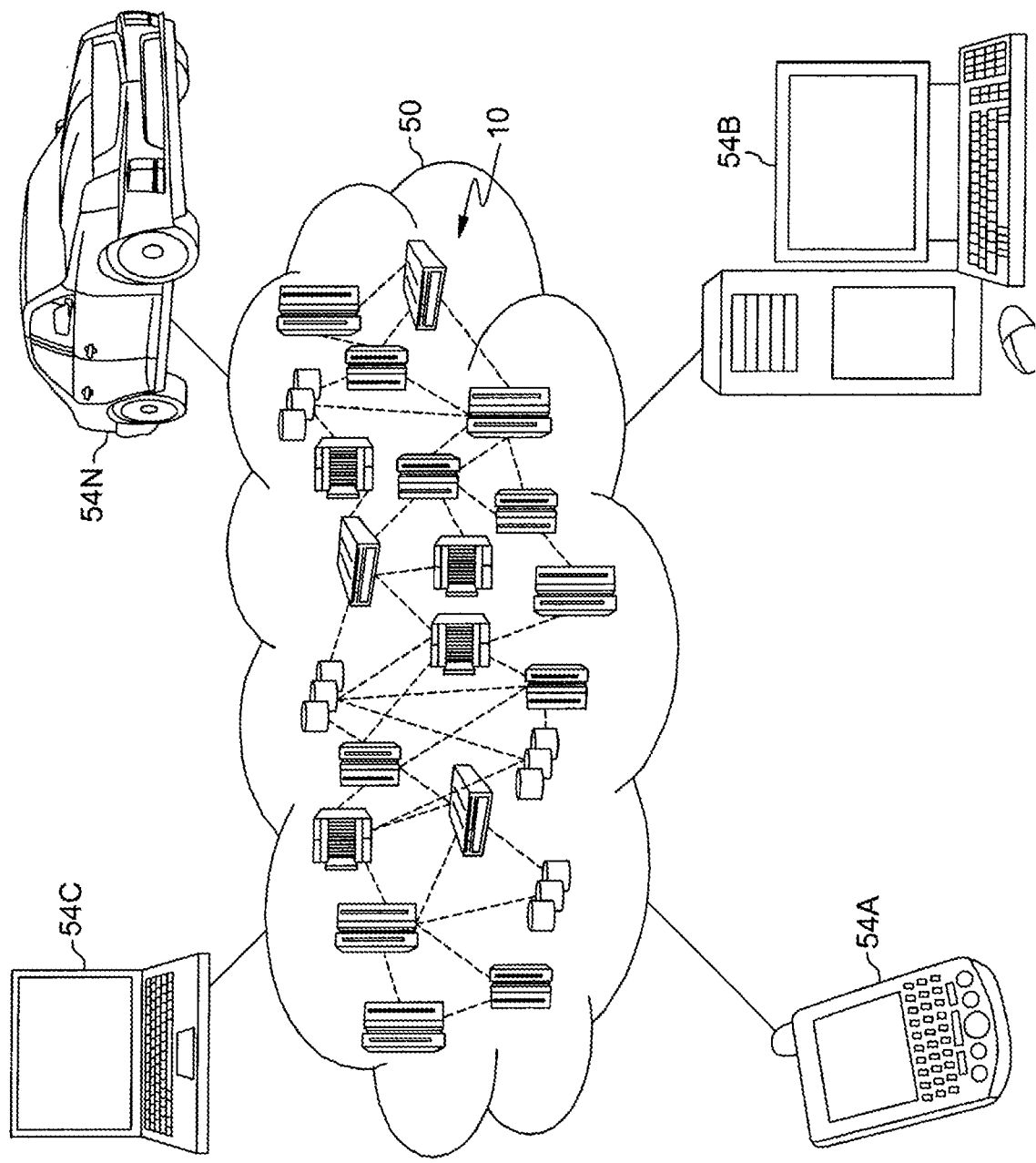
FIG. 9 depicts one embodiment of a cloud computing environment.

Referring now to FIG. 9, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
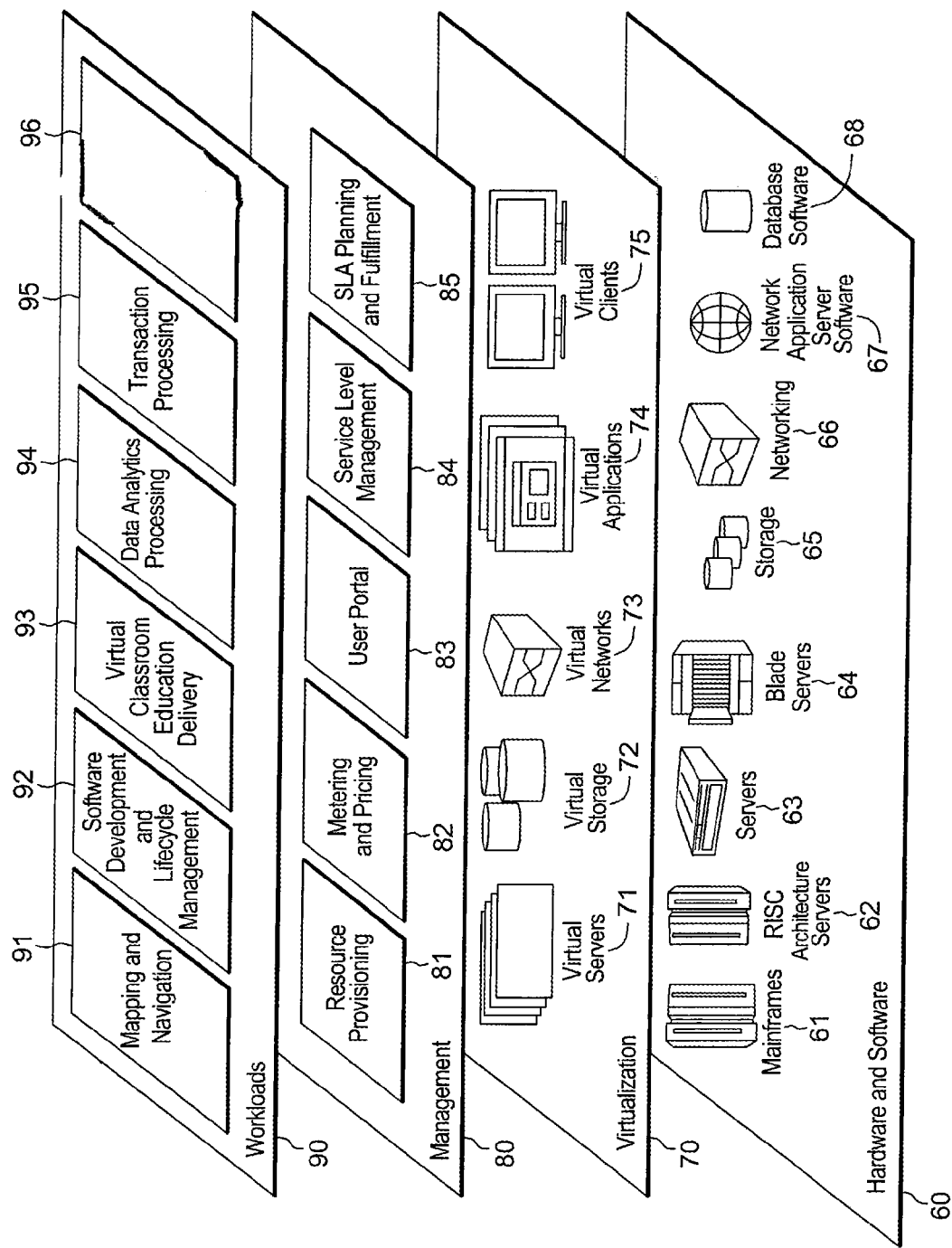
FIG. 10 depicts one example of abstraction model layers.

Referring now to FIG. 10, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below, which may include maintaining VPD at a VPD location the computer system. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and alerting a runtime environment that the sequence has occurred in the code being executed in the environment.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method, comprising:
defining, by one or more processors, a code fingerprint based on selecting parameters related to an event and an event type;
loading, by the one or more processors, the code fingerprint into a register accessible to the one or more processors;
during execution of a program in a runtime environment, reading, by the one or more processors, the register to identify the code fingerprint in the register, wherein the code fingerprint comprises a parameter field in the register, and wherein, based on the parameter field in the register, the identifying the code fingerprint in the register is based on instructions comprising the program;
identifying, by the one or more processors, the code fingerprint in the register; and alerting, by the one or more processors, the runtime environment that the code fingerprint has been identified, based on the identifying the code fingerprint in the register.

2. The computer-implemented method of claim 1, wherein the event type is selected from the group consisting of: a load-type event and a branch-type event.

3. The computer-implemented method of claim 2, wherein based on selecting the event type, selecting, by the one or more processors, one or more events of the event type as a portion of the parameters.

4. The computer-implemented method of claim 3, wherein the selected event type is the branch-type event and the one or more events of the event type are selected from the group consisting of: a branch direction sequence, a branch direction hit/miss sequence, and a branch target hit/miss sequence.

5. The computer-implemented method of claim 4, wherein the parameter field in the register specifies the branch target hit/miss sequence, and wherein the instructions comprising the program comprise direct or indirect branch instructions comprising the program.

6. The computer-implemented method of claim 4, wherein the code fingerprint comprises conditional branch instructions, and wherein the identifying the code fingerprint in the register is based on conditional branch instructions comprising the program and the reading the register to identify the code fingerprint in the register comprises ignoring direct or indirect branch instructions comprising the program.

7. The computer-implemented method of claim 3, wherein the selected event type is the load-type event and the one or more events of the event type are selected from the group consisting of: a L1 load data cache hit/miss sequence, a L2 load data cache hit/miss sequence, and a L3 load data cache hit/miss sequence.

8. The computer-implemented method of claim 1, wherein selecting the parameters comprises selecting the parameters from a source.

9. The computer-implemented method of claim 8, wherein the source comprises a memory selected from the group consisting of: a hardware memory and a software memory.

10. The computer-implemented method of claim 1, further comprising:
providing, by the one or more processors, visibility to the program with visibility to the register based on the identifying the code fingerprint in the register.

11. A computer program product comprising:
a non-transitory computer readable storage medium readable by one or more processors and storing instructions for execution by the one or more processors for performing a method comprising:
defining, by the one or more processors, a code fingerprint based on selecting parameters related to an event and an event type;
loading, by the one or more processors, the code fingerprint into a register accessible to the one or more processors;
during execution of a program in a runtime environment, reading, by the one or more processors, the register to identify the code fingerprint in the register, wherein the code fingerprint comprises a parameter field in the register, and wherein, based on the parameter field in the register, the identifying the code fingerprint in the register is based on instructions comprising the program;
identifying, by the one or more processors, the code fingerprint in the register; and
alerting, by the one or more processors, the runtime environment that the code fingerprint has been identified, based on the identifying the code fingerprint in the register.

12. The computer program product of claim 11, wherein the event type is selected from the group consisting of: a load-type event and a branch-type event.

13. The computer program product of claim 12, wherein based on selecting the event type, selecting, by the one or more processors, one or more events of the event type as a portion of the parameters.

14. The computer program product of claim 13, wherein the selected event type is the branch-type event and the one or more events of the event type are selected from the group consisting of: a branch direction sequence, a branch direction hit/miss sequence, and a branch target hit/miss sequence.

15. The computer program product of claim 14, wherein the parameter field in the register specifies the branch target hit/miss sequence, and wherein the instructions comprising the program comprise direct or indirect branch instructions comprising the program.

16. The computer program product of claim 14, wherein the code fingerprint comprises conditional branch instructions, and wherein the identifying the code fingerprint in the register is based on conditional branch instructions comprising the program and the reading the register to identify the code fingerprint in the register comprises ignoring direct or indirect branch instructions comprising the program.

17. The computer program product of claim 13, wherein the selected event type is the load-type event and the one or more events of the event type are selected from the group consisting of: a L1 load data cache hit/miss sequence, a L2 load data cache hit/miss sequence, and a L3 load data cache hit/miss sequence.

18. The computer program product of claim 11, wherein selecting the parameters comprises selecting the parameters from a source.

19. The computer program product of claim 18, wherein the source comprises a memory selected from the group consisting of: a hardware memory and a software memory.

20. A system comprising:
a memory;
one or more processors in communication with the memory; and
program instructions executable by the one or more processors via the memory to perform a method, the method comprising:
defining, by the one or more processors, a code fingerprint based on selecting parameters related to an event and an event type;
loading, by the one or more processors, the code fingerprint into a register accessible to the one or more processors;
during execution of a program in a runtime environment, reading, by the one or more processors, the register to identify the code fingerprint in the register, wherein the code fingerprint comprises a parameter field in the register, and wherein, based on the parameter field in the register, the identifying the code fingerprint in the register is based on instructions comprising the program;
identifying, by the one or more processors, the code fingerprint in the register; and alerting, by the one or more processors, the runtime environment that the code fingerprint has been identified, based on the identifying the code fingerprint in the register.

* * * * *